United States Patent
Strandh et al.

(10) Patent No.: US 8,818,542 B2
(45) Date of Patent: Aug. 26, 2014

(54) METHOD AND DEVICE FOR REDUCING INTERFERENCE IN AN AUDIO SIGNAL DURING A CALL

(75) Inventors: Jonny Strandh, Höör (SE); Kaj Ullén, Bjärred (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 236 days.

(21) Appl. No.: 13/288,245

(22) Filed: Nov. 3, 2011

(65) Prior Publication Data

US 2012/0116753 A1 May 10, 2012

Related U.S. Application Data

(60) Provisional application No. 61/410,964, filed on Nov. 8, 2010.

(30) Foreign Application Priority Data

Nov. 5, 2010 (EP) .................................. 10190148

(51) Int. Cl.
*H04B 15/00* (2006.01)
*G10L 21/02* (2013.01)

(52) U.S. Cl.
USPC ............. 700/94; 375/285; 375/135; 375/346; 375/350; 381/94.2; 381/94.1; 455/63.1; 455/296; 455/570; 370/201; 370/286

(58) Field of Classification Search
USPC ........ 375/285, 135, 346, 350; 381/94.2, 94.1; 455/296, 570; 370/201, 286
See application file for complete search history.

(56) References Cited

U.S. PATENT DOCUMENTS

| | | | |
|---|---|---|---|
| 6,469,657 B1 * | 10/2002 | Fox | 342/147 |
| 6,496,686 B1 * | 12/2002 | Charkani (El Hassani) et al. | 455/114.1 |
| 6,608,904 B1 | 8/2003 | Feltstrom | |
| 6,847,689 B1 * | 1/2005 | Vuorinen et al. | 375/350 |
| 6,865,276 B1 | 3/2005 | Ljungberg et al. | |
| 2002/0123308 A1 | 9/2002 | Feltstrom | |
| 2008/0243497 A1 * | 10/2008 | Tashev et al. | 704/227 |

FOREIGN PATENT DOCUMENTS

EP 1 228 572 B1 8/2005

OTHER PUBLICATIONS

European Search Report, corresponding to Application No. EP 10 19 0148, date of completion of search Feb. 10, 2011.

\* cited by examiner

*Primary Examiner* — Curtis Kuntz
*Assistant Examiner* — Thomas Maung
(74) *Attorney, Agent, or Firm* — Renner, Otto, Boisselle & Sklar, LLP.

(57) ABSTRACT

In order to reduce interference in an audio signal during a call on a mobile communication device, a plurality of transforms of the audio signal is performed, each transform containing phase information and amplitude information of corresponding samples of the audio signal. The results of the transforms are then averaged in order to generating a compensation signal that can be subtracted from the audio signal.

19 Claims, 2 Drawing Sheets

METHOD AND DEVICE FOR REDUCING INTERFERENCE IN AN AUDIO SIGNAL DURING A CALL

CROSS-REFERENCE TO RELATED APPLICATION

This application claims the benefit of U.S. Provisional Patent Application Ser. No. 61/410,964, filed Nov. 8, 2010, the entire disclosure of which is hereby incorporated by reference.

TECHNICAL FIELD OF THE INVENTION

The present invention relates to a method and device for reducing interference in an audio signal during a call with a mobile communication device, and especially for reducing the interference that is induced by transmission bursts of the mobile communication device during an ongoing call.

DESCRIPTION OF RELATED ART

There are a lot of wireless communications systems for transferring voice and data services on the market today. Such communication systems include the Global System for Mobile communication (GSM), for example. A common problem during signalling in such communication systems is that an interfering signal is introduced into the audio signal when the mobile communication device is transmitting. This interfering signal may be generated due to the fact that the transmitting device transmits high frequency bursts whose envelope introduces a noise signal. During GSM signalling, for example, the mobile communication device transmits high frequency bursts that are 0.57 ms long with a frequency of 217 Hz. The resulting interfering noise signal is transmitted together with the audio or speech signal to the receiver and causes a humming sound which commonly is referred to as a "bumble bee".

There have been suggested many solutions to the bumble bee problem. Earlier solutions to this problem include redesigning of the hardware, such as a better placement of components, use of special components or special microphones etc. However, the mobile communication devices of today are becoming smaller and smaller, which makes the hardware design option more difficult. The smaller size of the mobile communication device also makes it inevitable to situate the microphone far from the transmitting antenna. Thus, in modern mobile communication devices the bumble bee problem might even be bigger.

Another solution to the bumble bee problem is to add different types of filters that can filter out the bumble bee component of the signal. The addition of such filtering components increases the cost, complexity and size of the mobile communication device. Thus, there is a need for a method and a mobile communication device that solve the bumble bee problem without adding costs, complexity or size.

SUMMARY OF THE INVENTION

Hence, it is an object of the present invention to overcome the above-identified deficiencies related to the prior art and provide a mobile communication device and a method therefor, which allow to cancel or at least reduce the noise introduced by transmission bursts during an ongoing call with the mobile communication device.

According to a first aspect of the invention, a method for reducing interference in an audio signal during a call on a mobile communication device is provided, comprising the steps of (a) performing a plurality of transforms of the audio signal, each transform containing phase information and amplitude information of corresponding samples of the audio signal, (b) averaging results of the plurality of transforms performed in step (a), (c) generating a compensation signal on the basis of a result of the averaging performed in step (b), and (d) subtracting the compensation signal from the audio signal.

According to a preferred embodiment of the invention, the transforms performed in step (a) are Fourier transforms of the audio signal.

According to another embodiment of the invention, the transforms of the audio signal are performed for consecutive samples of the audio signal.

According to a further embodiment of the invention, the averaging performed in step (b) is a vector averaging of the plurality of transforms, and in particular and preferably the compensation signal is generated in step (c) on the basis of phase information obtained from the vector averaging performed in step (b) and relative phase information between the consecutive samples.

Furthermore, according to the invention, a mobile communication device is provided, the mobile communication device comprising a controller for reducing interference in an audio signal during a call on the mobile communication device, the controller being configured to perform the steps of (a) performing a plurality of transforms of the audio signal, each transform containing phase information and amplitude information of corresponding samples of the audio signal, (b) averaging results of the plurality of transforms performed in step (a), (c) generating a compensation signal on the basis of a result of the averaging performed in step (b), and (d) subtracting the compensation signal from the audio signal.

According to a preferred embodiment of the invention, the transforms performed by the controller in step (a) are Fourier transforms of the audio signal.

According to another embodiment of the invention, the transforms of the audio signal are performed by the controller for consecutive samples of the audio signal.

According to a further embodiment of the invention, the averaging performed by the controller in step (b) is a vector averaging of the plurality of transforms, and in particular and preferably the compensation signal is generated in step (c) on the basis of phase information obtained from the vector averaging performed in step (b) and relative phase information between the consecutive samples.

According to a second aspect of the invention, a method for reducing interference in an audio signal during a call on a mobile communication device is Fourier transform is run on the same frequency as a transmission burst frequencies that are multiples of the transmission burst frequency. The amplitude and the phase relative to the starting point of the transmission burst is determined for each frequency in order to create a compensation signal by summarizing the amplitudes and phases, respectively. The compensation signal is then subtracted from the audio signal in order to remove the interference caused by the transmission burst.

According to a preferred embodiment of the invention, the Fourier transform is run for frequencies less than 4 kHz.

According to another embodiment of the invention, the Fourier transform is run for frequencies above 300 Hz.

Furthermore, according to the invention, a mobile communication device is provided, comprising a controller which is configured to run a Fourier transform on the same frequency as a transmission burst and on frequencies that are multiples of the transmission burst frequency. Then the controller determines the amplitude and the phase of relative the starting point of the transmission burst for these frequencies in order to create a compensation signal. The compensation signal is created by summarizing the phases and amplitudes, respectively. The controller then subtracts the compensation signal from the audio signal in order to remove the interference caused by the transmission burst.

According to a preferred embodiment of the invention, the controller runs the Fourier transform for frequencies less than 4 kHz.

According to another embodiment of the invention, the controller runs the Fourier transform for frequencies above 300 Hz.

According to a fourth aspect of the present invention a computer program product or a computer program comprising program code stored on a computer readable medium is accomplished for performing the method of the present invention when said product is run on a controller of a mobile communication device.

BRIEF DESCRIPTION OF THE DRAWINGS

The present invention will now be described in more detail in relation to the enclosed drawings, in which.

DETAILED DESCRIPTION OF EMBODIMENTS

A mobile communication device according to various embodiments of the present invention will now be described in relation to a speech call with cellular telephone, and especially a cellular telephone operating in a GSM system. However, it should be understood that the invention is not limited to a speech call, and the invention is also not limited to GSM communication as the invention can also be used to detect noise or an interfering signal from other systems, especially other communication systems using multiple time slots, such as CPRS.

Figure 1:
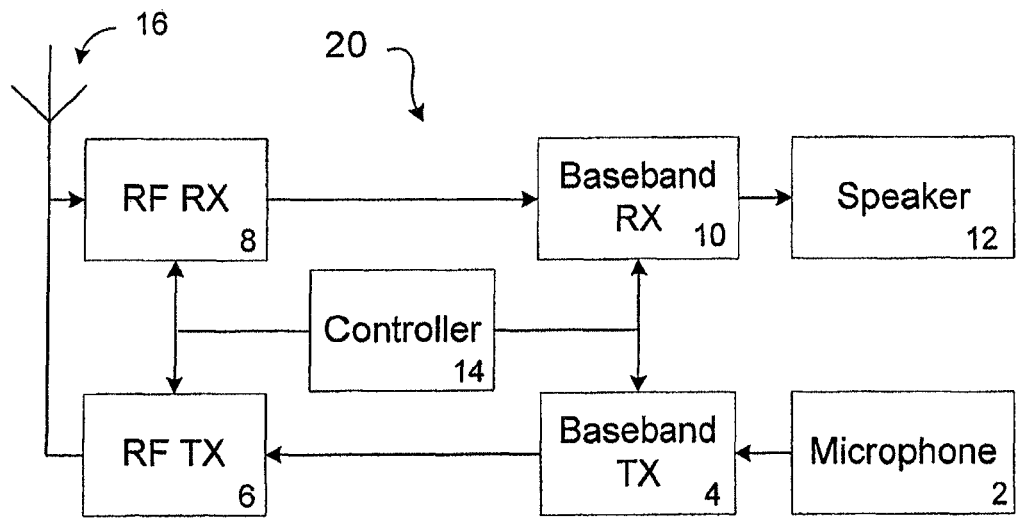
FIG. 1 shows a schematic block diagram of a mobile communication device according to an embodiment of the invention.

FIG. 1 shows a schematic block diagram of such a cellular telephone 20, which comprises a microphone 2, transmitter baseband circuitry 4, transmitter RF circuitry 6, receiver RF circuitry 8, receiver baseband circuitry 10, a loudspeaker 12, a controller 14 and an antenna 16.

At the transmitting side of the cellular telephone 20, speech from a user is inputted at the microphone 2 and processed at the transmitter baseband circuitry 4. The processed signal is then up-converted to RF and amplified in the transmitter RF circuitry 6 before it is transmitted over the air via the antenna 16.

At the receiving side of the cellular telephone 20 signals are received by the antenna 16 and supplied to the receiver RF circuitry 8, where they are down-converted to baseband. In the receiver baseband circuitry 10 they are further processed, resulting in signals that are output to drive the loudspeaker 12.

The baseband and RF circuitry 4, 6, 8, 10 are all controlled by the controller 14 which may switch off the receiver RF circuitry 8 when the transmitter RF circuitry 6 is switched on and vice versa. Even if the receiver RF circuitry 8 will be switched off during transmission, the receiver baseband circuitry 10 will always be switched on in order to provide a continuous output to the user.

Since the receiver baseband circuitry 10 always is turned on, it will also be susceptible to interference, especially during transmission bursts, which will be described further below. It should be noted that the above description of the cellular telephone 20 is only schematic since it is believed that a person skilled in the art is familiar with how the cellular telephone may be designed in order to operate in a mobile communication system, such as a GSM system.

Figure 2:
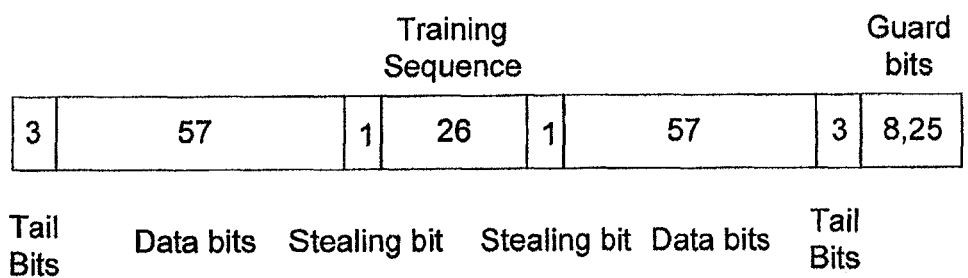
FIG. 2 shows the format of a normal GSM burst.

FIG. 2 illustrates a normal burst used for transmission in GSM. The normal burst is used to carry data and most signaling. It has a total length of 156.25 bits and is, as shown in FIG. 2, made up of two 57 bit data bits, a 26 bit training sequence used for equalization, 1 stealing bit for each data block, 3 tail bits at each end and 8.25 guard bits. The transmitting technique used in GSM is Time Division Multiple Access (TDMA). A TDMA-frame comprises eight time slots, which are numbered 0-7, one of which is used for the GSM normal burst. A cellular telephone in the GSM system uses the same time slot in every TDMA-frame until the network will instruct it to use another time slot, i.e. when a handover to another base station is performed. The duration of each time slot is about 0.577 ms and the period time of the TDMA-frame is eight times a time slot, i.e. 4.61 ms. It is during the assigned time slot the cellular telephone will transmit its information by sending electromagnetic bursts, as depicted in FIG. 2. The fundamental frequency with which the bursts are repeated is about 217 Hz.

According to an embodiment of the present invention, the fact may be used that in GSM signaling the frequency with which the bursts are repeated is known. Thus, the interference caused by the bursts is periodic and may therefore be viewed as a Fourier series expansion. Furthermore, it may also be known during which time slot a burst is sent, although the knowledge about these time slots is not necessary for carrying out the invention.

According to a first aspect of the invention, the TDMA noise introduced by the periodic transmission of these bursts can be identified by the controller 14 by performing a series of transforms containing both phase and frequency information and averaging the results of these transforms. One possibility for these transforms is the use of a Fourier Transform, in particular the use of a discrete Fourier Transform or a Fast Fourier Transform.

According to an embodiment of the invention, the TDMA noise signal is identified by performing a vector average on a plurality of consecutive Fourier transforms. If such a number of consecutive analyses of the spectrum is combined with a vector averaging, only those signals having a "constant phase" will remain after the vector averaging step. Since the TDMA noise has a constant phase over fairly long times and the audio signal has a varying phase over time, only the TDMA noise signal will remain after the vector averaging step, so that the TDMA noise signal can be identified without knowing the absolute phase thereof (which is set by the time slots in the radio communication over the air).

It may be beneficial to perform the spectrum analyses only around those frequencies where one can expect the frequency of the transmission bursts and the harmonics thereof to appear in order to save computing resources.

It should be noted that, according to this embodiment of the invention, the phase and the amplitude in the frequency bins do not have to be compared with the transmission burst in order to be able to create the compensation signal. Instead, it is sufficient to use the relative phase information between the consecutive samples of the audio signal and the phase information of the vector averaging step to create the compensation signal that may then be subtracted by the controller 14 from the audio signal.

The method according to the above embodiment of the invention is not limited to GSM communication since the vector average of consecutive spectrum analyses will also show TDMA noise from other systems. For example, this method would also cover GPRS communication with multiple time slots as the absolute phase and duty cycle of the TDMA noise signal do not have to be known in advance.

Figure 3:
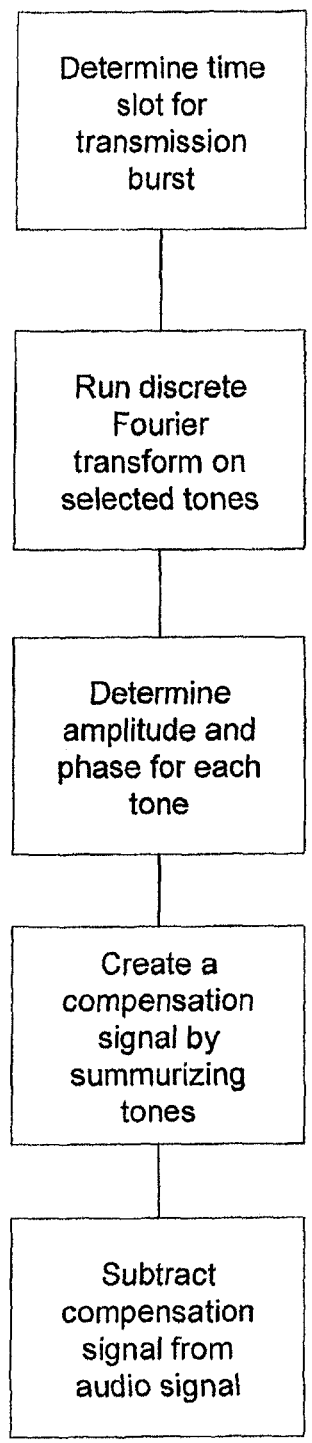
FIG. 3 shows a flow chart showing the steps of a method according to an embodiment the present invention.

Turning now to FIG. 3, a method according to a second aspect the present invention will be described.

The method, is run by the controller 14 depicted in FIG. 1. In a first step the controller 14 may determine the time slot in which the cellular telephone 20 is transmitting bursts. As mentioned above, this time slot will be the same until the cellular telephone switches to another base station, i.e. when it performs a handover. This step, however, is only optional and is not absolutely necessary for carrying out the method of this embodiment.

In a subsequent step, the controller 14 runs a discrete Fourier transform on the same frequency as the burst frequency, i.e. about 217 Hz, and also on frequencies or tones that have a frequency being a multiple of the transmission burst frequency. In a preferred embodiment of the present invention, the discrete Fourier transform is only performed on tones that have a frequency below 4 kHz. The limitation of the number of tones on which the discrete Fourier transform is performed will of course speed up the method and also reduce the power required to perform the method. Having a cut off at 4 kHz will no affect the quality negatively since there are a lot of filters in the GSM network that filter out frequencies above 3.2-4 kHZ. For the same reason, according to another embodiment of the present invention, tones under 300 Hz, i.e. one tone, may be left out.

Thus, by running a discrete Fourier transform on the above mentioned tones, it is possible to identify and collect information about each tone that causes the interference. After the discrete Fourier transform has been performed the controller 14 now, for each tone that is causing interference, has information about the amplitude and phase relative to the starting point of the transmission burst. All the identified tones are then summarized to one signal. In the preferred embodiment of the present invention, in which only tones between 300-4000 Hz are of interest, the amplitudes and phases of 17 tones will be summarized. The signal created in this way may be used as a bumble bee compensation signal. Thus, in the next step of the method according to this embodiment of the present invention, the bumble bee compensation signal is subtracted from the audio signal. This will result in a bumble bee free audio signal.

It should be understood that the method for finding the bumble bee compensation signal runs continuously during a telephone call since the power level of transmission may vary, depending on for example how the cellular telephone is held or if hands-free equipment is used or not During handover between two base stations the cellular telephone will change the time slot, as mentioned above. The handover will also change the amplitudes and phases of the tones abruptly.

Thus, by using the method according to the present invention, the bumble bee noise may be eliminated without adding cost or complexity to the mobile communication device. Given the above description of the present invention it is believed that a person skilled in the art may implement the method by programming the controller in a suitable manner.

The invention claimed is:

1. A method for reducing interference in an audio signal during a call on a mobile communication device, comprising the steps of:
    (a) performing a plurality of consecutive transforms of the audio signal, each transform containing phase information and amplitude information of the same consecutive samples of the audio signal,
    (b) averaging results of the plurality of transforms performed in step (a) to identify an interference signal in the audio signal having a constant phase over the samples of the audio signal,
    (c) generating a compensation signal on the basis of the interference signal, and
    (d) subtracting the compensation signal from the audio signal.

2. The method according to claim 1, wherein the transforms performed in step (a) are Fourier transforms of the audio signal.

3. The method according to claim 1, wherein the averaging performed in step (b) is a vector averaging of the plurality of transforms.

4. The method according to claim 3, wherein the compensation signal is generated in step (c) on the basis of phase information obtained from the vector averaging performed in step (b) and relative phase information between the consecutive samples.

5. A method for reducing interference in an audio signal during a call on a mobile communication device, comprising the steps of:
    (a) performing a Fourier transform on the same frequency as a transmission burst transmitted with said audio signal and on multiples of the frequency of the transmission burst,
    (b) determining an amplitude and a phase relative to a starting point of the transmission burst for each frequency for which the Fourier transform is performed in step (a),
    (c) summarizing the amplitudes and phases determined in step (b) to identify an interference signal in the audio signal having a constant phase for each frequency for which the Fourier transform is performed in step (a),
    (d) generating a compensation signal on the basis of the interference signal and
    (e) subtracting the compensation signal from the audio signal.

6. The method according to claim 5, wherein the Fourier transform is performed in step (a) for frequencies less than 4 kHz.

7. The method according to claim 5, wherein the Fourier transform is performed in step (a) for frequencies above 300 Hz.

8. A mobile communication device,
    wherein a controller of the mobile communication device is configured to perform the steps of:
    (a) performing a plurality of consecutive transforms of the audio signal, each transform containing phase information and amplitude information of the same consecutive samples of the audio signal,
    (b) averaging results of the plurality of transforms performed in step (a) to identify an interference signal in the audio signal having a constant phase over the samples of the audio signal,
    (c) generating a compensation signal on the basis of the interference signal, and
    (d) subtracting the compensation signal from the audio signal.

9. The mobile communication device according to claim 8, wherein the transforms performed in step (a) are Fourier transforms of the audio signal.

10. The mobile communication device according to claim 8, wherein the averaging performed in step (b) is a vector averaging of the plurality of transforms.

11. The mobile communication device according to claim 10, wherein the controller generates the compensation signal in step (c) on the basis of phase information obtained from the vector averaging performed in step (b) and relative phase information between the consecutive samples.

12. A mobile communication device,
wherein a controller of the mobile communication device is configured to perform the steps of:
(a) performing a Fourier transform on the same frequency as a transmission burst transmitted with said audio signal and on multiples of the frequency of the transmission burst,
(b) determining an amplitude and a phase relative to a starting point of the transmission burst for each frequency for which the Fourier transform is performed in step (a),
(c) summarizing the amplitudes and phases determined in step (b) to identify an interference signal in the audio signal having a constant phase for each frequency for which the Fourier transform is performed in step (a),
(d) generating a compensation signal on the basis of the interference signal, and
(e) subtracting the compensation signal from the audio signal.

13. The mobile communication device according to claim 12, wherein the controller performs the Fourier transform for frequencies less than 4 kHz.

14. The mobile communication device according to claim 12, wherein the controller performs the Fourier transform for frequencies above 300 Hz.

15. A computer program product comprising program code stored on a non-transitory computer readable medium for performing the method of claim 1 when said computer program product is run on a controller of a mobile communication device.

16. The method according to claim 1, wherein subtracting the compensation signal from the audio signal reduces noise present in the audio signal.

17. The method according to claim 5, wherein subtracting the compensation signal from the audio signal reduces noise present in the audio signal.

18. The mobile communication device according to claim 8, wherein subtracting the compensation signal from the audio signal reduces noise present in the audio signal.

19. The mobile communication device according to claim 12, wherein subtracting the compensation signal from the audio signal reduces noise present in the audio signal.

* * * * *